Patented Feb. 5, 1952

2,584,538

UNITED STATES PATENT OFFICE 2,584,538

6 AND 7-BROMOMETHYL PTERIDINES AND PROCESS OF PREPARING SAME

James H. Boothe, Pearl River, N. Y., assignor to American Cyanamid Company, New York, N. Y., a corporation of Maine No Drawing. Application June 24, 1948, Serial No. 35,069

10 Claims. (Cl. 260—251.5)

This invention relates to new organic compounds. More particularly, it relates to bromopteridines and methods of preparation thereof.

In my application, Serial No. 686,716, filed July 27, 1946, now Patent No. 2,547,519, I described the preparation of 6-halomethyl pteridines and the reaction of these compounds with para-aminobenzoylglutamic acid to produce pteroylglutamic acid. This application, which is a continuation-in-part thereof, describes and claims the 6-bromomethyl pteridines, 6-monobromomethyl pteridine and 6-dibromomethyl pteridine, as well as other bromomethyl pteridines. The bromopteridines of the present application may be represented by the formula:

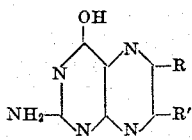

in which R and R' are members of the group consisting of hydrogen, methyl, bromomethyl and dibromomethyl radicals, at least one being a bromomethyl radical. Such compounds can be prepared by brominating the corresponding methyl pteridine under conditions set forth in my application, Serial No. 686,716, and as described in detail hereinafter.

The compounds of the present invention are generally yellowish to white crystalline substances, slightly soluble in hot water and soluble in acids and dilute alkali and are relatively insoluble in ether, acetone and alcohols, except in the presence of strong acids. They are useful as intermediates in the preparation of pteroylglutamic acid and related compounds.

The 6-methyl and 7-methyl pteridines used as intermediates in the present process are prepared by methods described in a co-pending application of John H. Mowat, Serial No. 633,870, filed December 8, 1945, now Patent No. 2,443,078.

The compounds of the present invention are prepared by heating the corresponding 6 or 7-methyl pteridine or 6,7-dimethyl pteridine with bromine in the presence of a suitable solvent such as concentrated hydrobromic acid, ethylene glycol, trichloroacetic acid and the like. As described in the co-pending application, the product first obtained on bromination of 6-methyl pteridine with an excess of bromine is a mixture of the mono- and di-bromomethyl pteridine. The dibromomethyl pteridine is less soluble than the monobromomethyl pteridine and on concentrating a solution containing both, the dibromo compound will separate out first. In brominating the 7-methyl pteridine with an equivalent amount of bromine the 7-monobromomethyl pteridine is obtained whereas with an excess of bromine the dibromomethyl pteridine is predominant.

The reaction of the present invention is preferably carried out at a temperature of from about 40° C. to 150° C. The reaction can be carried out at the lower temperatures. However, for practical purposes it is more desirable to carry out the reaction under refluxing conditions of the particular solvent used.

Another method of preparing the present compounds is to react 2,4,5-triamino-6-hydroxypyrimidine with bromomethyl glyoxal, dibromodiacetyl, tetrabromodiacetyl and the like. This method depends on the formation of the pteridine ring having the bromomethyl radical in the desired position.

On crystallizing the compounds of the present invention from strong acids, such as concentrated hydrobromic acid, the corresponding acid salt separates from solution. However, if a strong acid solution of the compound is diluted with water, ethanol, methanol, etc. the free base is obtained.

To illustrate the invention with greater detail, reference is made to the following specific examples in which various 6 or 7-bromomethyl pteridines or 6,7-bromodimethyl pteridines are prepared.

Example 1

A mixture of 12 g. of 2-amino-4-hydroxy-6-methylpteridine, 400 cc. of 48% hydrobromic acid solution and 12 cc. of bromine are heated on a steam bath overnight. This bromination mixture with the excess bromine present is then chilled overnight. Some of the brominated product separates as brown cubes which appear to be a bromine complex of the brominated pterin. These crystals are isolated mechanically and crystallized from 48% hydrobromic acid by running therein a current of air-bromine mixture. As the bromine concentration becomes sufficient, the product separates as brown cubes, but where a large excess of bromine is present the product separated as yellow needles. The crystalline product is collected and washed with 48% hydrobromic acid, which changes the yellow needles to brown cubes. The brown cubes are crystallized twice from hot glacial acetic acid (which contained from 1 to 5% hydrogen bromide) by cooling to give a white crystalline solid with the excess bromine which formed the bromine complex remaining in the solvent. The product on analysis for carbon, hydrogen, nitrogen and bromine agreed very closely with the theoretical values for 2-amino-4-hydroxy-6-dibromomethylpteridine hydrobromide which is a white crystalline solid.

Example 2

A mixture of 50 g. of 2-amino-4-hydroxy-6-methylpteridine, 50 cc. of bromine and 1500 cc. of 48% hydrobromic acid is heated on the steam bath for 20 hours. The solution obtained is concentrated to 500 cc. under reduced pressure and at steam bath temperature. The concentrated solution is chilled at −5° C. overnight. A very small amount of crystalline material (1.75 g.) separates which is removed by filtration. The filtrate is treated with activated charcoal and concentrated to about 350 cc. After cooling thoroughly a crystalline material is isolated, washed with 48% hydrobromic acid, acetone and ether; weight 20 g. By evaporation and cooling a second crop of 18 g. is obtained. This material on analysis proved to be 2-amino-4-hydroxy-6-dibromomethylpteridine hydrobromide.

Example 3

The final filtrate obtained in the above example is evaporated to dryness. The residue obtained is suspended in a liter of cold water, shaken, collected, washed with water, alcohol and ether and dried. A yield of 27 g. of pterin is obtained which is predominately 6-monobromomethyl pteridine.

This product, when reacted with para-aminobenzoylglutamic acid under suitable conditions, produced pteroylglutamic acid in from 9% to 27% pure material.

Example 4

To 1 liter of 48% hydrobromic acid is added 20 g. of 2-amino-4-hydroxy-6-methylpteridine and 12 cc. of bromine and the mixture refluxed for 1 hour to affect solution and to complete the bromination. This solution is concentrated to 500 cc. under reduced pressure. The concentrated solution is treated with 21 g. of activated charcoal, filtered, and run into 3½ liters of cold water. The diluted aqueous solution is neutralized with enough sodium acetate to bring the pH to 3 to 5. The product is predominately 2-amino-4-hydroxy-6-dibromomethylpteridine. Weight 24 g.

Example 5

A solution of 50 g. of 2-amino-4-hydroxy-7-methylpteridine in three (3) liters of 48% hydrobromic acid is prepared at steam bath temperature. To this vigorously stirred solution is added dropwise a solution of 50 g. of bromine in 300 cc. of 48% hydrobromic acid. This solution is heated for 20 minutes more, concentrated to 500 cc., chilled overnight, filtered and evaporated to dryness. The residue is ground to a fine powder in water and diluted to 3 liters. The suspended product is collected, washed and dried. A yield of 60 g. of 2-amino-4-hydroxy-7-bromomethylpteridine is obtained.

Example 6

A mixture of 100 g. of 2-amino-4-hydroxy-7-methylpteridine and 1500 cc. of 48% hydrobromic acid is heated for 20 minutes on the steam bath, and then to this hot mixture is added a solution of 100 g. of bromine in 200 cc. of 48% hydrobromic acid through a dropping funnel in a very fine stream. The mixture becomes a clear solution when about half of the bromine-hydrobromic acid is added. After completing the addition of the bromine the solution is heated for 20 minutes more, concentrated to one liter, chilled overnight, concentrated to 500 cc., treated with 50 g. of activated charcoal, filtered, cooled at −5° C. a second time overnight, and filtered. This isolated product is recrystallized twice from 48% hydrobromic acid, slurried in ethanol, collected, washed with ethanol and ether, and dried. The analysis of this material for carbon, hydrogen, nitrogen and bromine agreed with the theoretical values for 2-amino-4-hydroxy-7-bromomethylpteridine.

Example 7

A solution of 40 g. of 2-amino-4-hydroxy-7-methylpteridine in 1200 cc. of 48% of hydrobromic acid is prepared by heating to 70°–95° C. After most of the pterin dissolves, 40 cc. of bromine is added, and the solution heated on the steam bath for 2 hours. This solution is concentrated to 1 liter, treated with charcoal and filtered. The filtrate is seeded and cooled for several hours. The crystalline 2-amino-4-hydroxy-7-dibromomethylpteridine (47.7 g.) is collected, washed with 48% hydrobromic acid and dried.

Example 8

2 g. of 2-amino-4-hydroxy-7-methylpteridine is dissolved in 40 cc. of 48% hydrobromic acid containing 4.0 g. of bromine. This is heated just under reflux temperature for 45 minutes and then 5 cc. of the solution is evaporated off under vacuum to remove excess bromine. After cooling overnight the resulting white crystalline compound is collected on a funnel and washed with a 48% hydrobromic acid solution. This is transferred to a flask and suspended in water containing several drops of pyridine. The crystalline material which is the hydrobromide salt immediately changes to an amorphous yellow solid. The solid is filtered off, washed with water, methanol and ether and dried. A yield of 2.3 g. of product is obtained which analyzed for carbon, hydrogen, nitrogen and bromine agrees with the theoretical values for 2-amino-4-hydroxy-7-dibromomethylpteridine.

That the two bromines are on the 7-methyl group of the pteridine is shown by the two following experiments: (1) A sample of the compound can be reduced using hydriodic acid in glacial acetic acid to give a 60% yield of pure 2-amino-4-hydroxy-7-methylpteridine. (2) A sample of the compound can be oxidized with alkaline permanganate solution to give an 85% yield of 2-amino-4-hydroxypteridine-7-carboxylic acid.

Example 9

To 5 g. of 2-amino-4-hydroxy-6,7-dimethyl pteridine stirred with 250 cc. of 48% hydrobromic acid and heated to 95° is added all at once 1.34 cc. of bromine in 10 cc. 48% hydrobromic acid. The dimethyl pterin goes into solution in a few minutes and the bromine color disappears rapidly. After 10 minutes the solution is cooled in ice 1 hour and the crystalline precipitate filtered off, washed and dried. A yield of 3.5 g. of 2-amino-4-hydroxy-6-methyl-7-bromomethyl pteridine is obtained.

Example 10

To 1.07 g. of 2,4,5-triamino-6-hydroxypyrimidine dihydrochloride dissolved in 25 cc. of 2.5 N hydrobromic acid is added 1.22 g. of dibromodiacetyl in 10 cc. of alcohol. After one hour at room temperature the solution is left in the chill room overnight. The solution is filtered from a small amount of crystalline material and the filtrate diluted with 100 cc. of cold water. After cooling 6 hours in ice the crystalline product is filtered off, washed with water, acetone and ether and dried, weight 0.9 g. This material on analysis for carbon, hydrogen, nitrogen and bromine closely agreed with the theoretical values for 6,7-dibromodimethylpterin.

*Example 11*

To 15 g. of 6,7-dibromodimethylpterin dissolved in 210 cc. of 48% hydrobromic acid is added water to give 750 cc. of solution (2.5 N hydrobromic acid). The solution is warmed to 55° C. and stirred while dropping in 7.13 g. KI in 25 cc. water over one hour. An iodine color slowly develops. The solution is kept at 55° C. one hour more and then cooled to 15° C. Sodium hydrosulfite is added until the dark iodine color is discharged and most of the black precipitate redissolves. The solution is filtered and neutralized to pH 1 with a saturated sodium acetate solution. The precipitate is filtered off, washed, and dried. A yield of 12.1 g. of product is obtained which is predominately 2 - amino - 4 - hydroxy - 6 - bromomethyl-7-methyl pteridine.

*Example 12*

200 mg. of 2-amino-4-hydroxy-6-methylpteridine is dissolved in a mixture of 7.5 cc. of ethylene glycol and 0.5 cc. of 48% (aqueous) hydrobromic acid at about 50° C. To this solution is added 250 mg. of bromine and the resulting solution warmed for about 45 minutes (at 50°–70° C.). This solution of the brominated methyl pteridine is mixed with 7.5 cc. of ethylene glycol which contained 0.5 g. of p-aminobenzoylglutamic acid. To this clear acidic solution is added 1 g. of potassium acetate to give a buffered mixture at about pH 4. The mixture is then heated overnight at 100° C. The product is isolated by diluting with 75 cc. of water and filtering. The washed and dried material weighs 0.2 g. and contains 8.29% pteroylglutamic acid as shown by chemical assay or 3.6% pteroylglutamic acid as shown by bioassay using *S. faecalis* R.

I claim:

1. Compounds having the general formula:

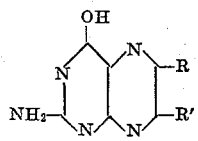

in which R and R' are members of the group consisting of hydrogen, methyl, bromomethyl and dibromomethyl radicals, at least one of which is a bromomethyl radical.

2. Compounds having the general formula:

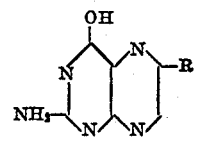

in which R is a bromomethyl radical.

3. 2 - amino - 4 - hydroxy - 6 - bromomethyl pteridine.

4. 2 - amino - 4 - hydroxy - 6 - dibromomethyl pteridine.

5. 2 - amino - 4 - hydroxy - 7 - bromomethyl pteridine.

6. A method of preparing compounds having the formula:

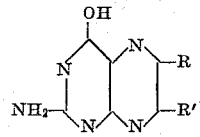

in which R and R' are members of the group consisting of hydrogen, methyl, bromomethyl and dibromomethyl radicals, at least one of which is a bromomethyl radical, which comprises heating a compound having the formula:

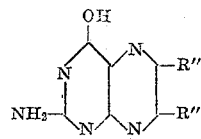

in which R'' and R''' are members of the group consisting of hydrogen and methyl radicals, at least one of which is a methyl radical with bromine in a suitable solvent and recovering said bromomethyl pteridine therefrom.

7. A method of preparing compounds having the formula:

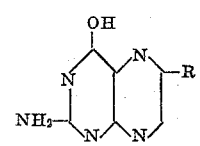

in which R is a bromomethyl radical which comprises heating 2 - amino - 4 - hydroxy - 6 - methyl pteridine with bromine in the presence of strong aqueous hydrobromic acid and recovering said 6-bromomethyl pteridine therefrom.

8. A method of preparing 2-amino-4-hydroxy-6-bromomethyl pteridine which comprises heating 2-amino-4-hydroxy-6-methyl pteridine with bromine and about 48% hydrobromic acid and recovering said 2-amino-4-hydroxy-6-bromomethyl pteridine.

9. A method of preparing 2-amino-4-hydroxy-6-dibromomethyl pteridine which comprises heating 2-amino-4-hydroxy-6-methyl pteridine with bromine and about 48% hydrobromic acid and recovering said 2-amino-4-hydroxy-6-dibromomethyl pteridine.

10. A method of preparing 2-amino-4-hydroxy-7-bromomethyl pteridine which comprises heating 2-amino-4-hydroxy-7-methyl pteridine with bromine and about 48% hydrobromic acid and recovering said 2-amino-4-hydroxy-7-bromomethyl pteridine.

JAMES H. BOOTHE.

No references cited.